(12) United States Patent
Mehrotra et al.

(10) Patent No.: US 9,870,154 B2
(45) Date of Patent: Jan. 16, 2018

(54) NETWORK STORAGE SYSTEM USING FLASH STORAGE

(71) Applicant: Sanmina Corporation, San Jose, CA (US)

(72) Inventors: Sharad Mehrotra, Saratoga, CA (US); Jack Mills, San Carlos, CA (US); Chris Youngworth, San Jose, CA (US); Jon Livesey, Sunnyvale, CA (US); Julian Ratcliffe, Portland, OR (US); Tim Lieber, Colorado Springs, CO (US); Paul Sweere, San Jose, CA (US)

(73) Assignee: Sanmina Corporation, San Jose, CA (US)

( * ) Notice: Subject to any disclaimer, the term of this patent is extended or adjusted under 35 U.S.C. 154(b) by 0 days.

(21) Appl. No.: 15/000,949

(22) Filed: Jan. 19, 2016

(65) Prior Publication Data

US 2016/0132242 A1 May 12, 2016

Related U.S. Application Data

(62) Division of application No. 13/844,663, filed on Mar. 15, 2013, now Pat. No. 9,304,902.

(51) Int. Cl.
*G06F 12/00* (2006.01)
*G06F 3/06* (2006.01)
(Continued)

(52) U.S. Cl.
CPC ............ *G06F 3/061* (2013.01); *G06F 3/0604* (2013.01); *G06F 3/067* (2013.01); *G06F 3/0635* (2013.01);
(Continued)

(58) Field of Classification Search
None
See application file for complete search history.

(56) References Cited

U.S. PATENT DOCUMENTS 5,615,329 A 3/1997 Kern et al.
5,724,501 A 3/1998 Dewey et al.
(Continued)

FOREIGN PATENT DOCUMENTS

WO WO-2009143381 A2 11/2009

OTHER PUBLICATIONS

"U.S. Appl. No. 13/844,663, Notice of Allowance dated Dec. 24, 2014", 8 pgs.
(Continued)

*Primary Examiner* — Daniel Tsui
(74) *Attorney, Agent, or Firm* — Schwegman Lundberg & Woessner, P.A.

(57) ABSTRACT

A system can comprise an I/O circuitry, a processor, reconfigurable circuitry, an array of flash storage devices, and a serial interconnect network that is coupled to transfer data between the I/O circuitry, the processor, the reconfigurable circuitry and the flash storage devices. The processor can be configured to designate an interconnect address space for use in communication over the interconnect network among the I/O circuitry, the processor, the reconfigurable circuitry and the flash storage devices. The reconfigurable circuitry can be configured to translate data addresses during transfers of data between the I/O circuitry and the array of flash storage devices. A method to access an array of flash storage devices that are coupled to I/O circuitry over a serial interconnect network can comprise using reconfigurable circuitry to capture data during transfers of data over the serial interconnect network.

10 Claims, 7 Drawing Sheets

(51) Int. Cl.
*G06F 12/02* (2006.01)
*G06F 12/0802* (2016.01)
*G06F 12/0868* (2016.01)

(52) U.S. Cl.
CPC .......... *G06F 3/0638* (2013.01); *G06F 3/0647* (2013.01); *G06F 3/0688* (2013.01); *G06F 12/0246* (2013.01); *G06F 12/0802* (2013.01); *G06F 12/0868* (2013.01); *G06F 2212/214* (2013.01); *G06F 2212/7203* (2013.01); *G06F 2212/7208* (2013.01)

(56) References Cited

U.S. PATENT DOCUMENTS

| | | |
|---|---|---|
| 6,032,232 A | 2/2000 | Lindeborg et al. |
| 6,061,750 A | 5/2000 | Beardsley et al. |
| 6,173,367 B1 | 1/2001 | Aleksic et al. |
| 6,205,507 B1 | 3/2001 | Elkhoury et al. |
| 6,460,122 B1 | 10/2002 | Otterness et al. |
| 6,529,963 B1 | 3/2003 | Fredin et al. |
| 6,604,154 B1 | 8/2003 | Takegami et al. |
| 6,820,171 B1 | 11/2004 | Weber et al. |
| 6,928,514 B2 | 8/2005 | Chatterjee et al. |
| 6,983,396 B2 | 1/2006 | Brant et al. |
| 7,210,071 B2 | 4/2007 | Deacon et al. |
| 7,299,266 B2 | 11/2007 | Boyd et al. |
| 7,836,204 B2 | 11/2010 | Kalos et al. |
| 8,117,376 B2 | 2/2012 | Hemmi |
| 8,495,329 B2 | 7/2013 | Duffy et al. |
| 9,118,698 B1 | 8/2015 | Radovanovic |
| 9,286,225 B2 | 3/2016 | Mehrotra et al. |
| 9,304,902 B2 | 4/2016 | Mehrotra et al. |
| 9,509,604 B1 | 11/2016 | Livesey et al. |
| 9,672,180 B1 | 6/2017 | Morshed et al. |
| 2002/0172195 A1 | 11/2002 | Pekkala et al. |
| 2003/0041211 A1 | 2/2003 | Merkey et al. |
| 2003/0084248 A1 | 5/2003 | Gaither et al. |
| 2004/0153598 A1 | 8/2004 | Thatipelli et al. |
| 2004/0193800 A1 | 9/2004 | Krehbiel, Jr. et al. |
| 2005/0240809 A1 | 10/2005 | Ash et al. |
| 2006/0031639 A1 | 2/2006 | Benhase |
| 2006/0193327 A1 | 8/2006 | Arndt et al. |
| 2006/0195663 A1 | 8/2006 | Arndt et al. |
| 2006/0242354 A1 | 10/2006 | Johnsen et al. |
| 2007/0156966 A1 | 7/2007 | Sundarrajan et al. |
| 2008/0137676 A1 | 6/2008 | Boyd et al. |
| 2008/0192648 A1 | 8/2008 | Galles |
| 2008/0244189 A1 | 10/2008 | Allison et al. |
| 2009/0016236 A1 | 1/2009 | Alcala et al. |
| 2009/0164700 A1 | 6/2009 | Chen et al. |
| 2010/0080117 A1 | 4/2010 | Coronado et al. |
| 2010/0248107 A1 | 9/2010 | Wu et al. |
| 2011/0029717 A1* | 2/2011 | Moshayedi ......... G06F 12/0246 711/103 |
| 2011/0191535 A1 | 8/2011 | Yuasa |
| 2011/0238938 A1 | 9/2011 | Kloeppner et al. |
| 2011/0320662 A1 | 12/2011 | Craddock et al. |
| 2012/0023282 A1* | 1/2012 | Rub .................... G06F 12/0246 711/103 |
| 2012/0079199 A1 | 3/2012 | Beardsley et al. |
| 2012/0093078 A1 | 4/2012 | Perlman et al. |
| 2013/0022201 A1 | 1/2013 | Glew et al. |
| 2013/0042066 A1 | 2/2013 | Price |
| 2013/0138911 A1 | 5/2013 | Gopalakrishnan et al. |
| 2013/0212431 A1 | 8/2013 | Ong |
| 2013/0286846 A1 | 10/2013 | Atlas et al. |
| 2013/0311706 A1 | 11/2013 | Okada et al. |
| 2014/0040677 A1 | 2/2014 | Matsui |
| 2014/0095785 A1 | 4/2014 | Nataraj |
| 2014/0189074 A1 | 7/2014 | Parker |
| 2014/0244876 A1 | 8/2014 | Colpo et al. |
| 2014/0281140 A1 | 9/2014 | Mehrotra et al. |
| 2014/0281153 A1 | 9/2014 | Mehrotra et al. |
| 2014/0281169 A1 | 9/2014 | Mehrotra et al. |
| 2014/0341029 A1 | 11/2014 | Allan et al. |
| 2015/0067253 A1 | 3/2015 | Madhusudana et al. |
| 2015/0095696 A1 | 4/2015 | Hess et al. |
| 2015/0124611 A1 | 5/2015 | Attar et al. |
| 2015/0127797 A1 | 5/2015 | Attar et al. |
| 2015/0138973 A1 | 5/2015 | Kumar et al. |
| 2016/0117281 A1 | 4/2016 | Akaike et al. |

OTHER PUBLICATIONS

"U.S. Appl. No. 13/844,663, Notice of Allowance dated Jul. 6, 2015", 7 pgs.

"U.S. Appl. No. 13/844,663, Response filed Apr. 24, 2015 to Non Final Office Action dated Dec. 24, 2014", 13 pgs.

"U.S. Appl. No. 13/931,650, Non Final Office Action dated Mar. 11, 2015", 23 pgs.

"U.S. Appl. No. 13/931,650, Notice of Allowance dated Sep. 25, 2015", 9 pgs.

"U.S. Appl. No. 13/931,650, Notice of Allowance dated Nov. 9, 2015", 5 pgs.

"U.S. Appl. No. 13/931,650, Response filed Jun. 22, 2015 to Non Final Office Action dated Mar. 11, 2015", 10 pgs.

"U.S. Appl. No. 13/958,310, Final Office Action dated Dec. 16, 2015", 16 pgs.

"U.S. Appl. No. 13/958,310, Non Final Office Action dated Jul. 17, 2015", 14 pgs.

"U.S. Appl. No. 13/958,310, Preliminary Amendment filed Aug. 5, 2013", 10 pgs.

"U.S. Appl. No. 13/958,310, Response filed Nov. 3, 2015 to Non Final Office Action dated Jul. 17, 2015", 10 pgs.

"U.S. Appl. No. 14/189,275, Non Final Office Action dated Jul. 16, 2015", 14 pgs.

"U.S. Appl. No. 14/189,275, Preliminary Amendment filed Mar. 5, 2014", 6 pgs.

"U.S. Appl. No. 14/189,275, Response filed Nov. 3, 2015 to Non Final Office Action dated Jul. 16, 2015", 11 pgs.

"ExpressFabric(r) PCI Express as a Converged, Rack-Level Interconnect", PLX Technology, (May 2013), 1-16.

"HP Moonshot System", Family Data Sheet (c) 2013 Hewlett-Packard Development Company, (Apr. 2013), 8 pgs.

"HP Moonshot System—Technical White Paper", (c) 2013 Hewlett-Packard Development Company, (2013), 1-8.

"HP Moonshot: An Accelerator for Hyperscale Workloads", (c) 2013 Moor Insights & Strategy, (2013), 9 pgs.

"Juniper Networks QFabric: Scaling for the Modern Data Center", (c) 2011 ACG Research, (2011), 1-9.

"Non-Transparent Bridging Simplied—Multi-Host System and Intelligent I/O Design with PCI Express", (c) 2004 PLX Technology, Inc., (2004), 4 pgs.

"Product Overview—Brief Overview of the Product Families & Applications", PLX Technology, (May 2013), 1-46.

"QFabric tm System", (c) 2013 Juniper Networks, Inc., (Jun. 2013), 12 pgs.

"Technology Brief PCI Express", PLX Technology, (2003), 5 pgs.

"The data center of tomorrow: How disruptive will new technologies be?", (c) 2013 Goldman Sachs, (Apr. 10, 2013), 1-34.

"White Paper: Egenera Cloud Suite", (c) 2013 Egenera Inc., (2013), 8 pgs.

Blake, Bob, "Choosing the Right Programmable Logic Solution for PCI Express Applications", [online]. Retrieved from the Internet: <URL: http://www.rtcmagazine.com/articles/view/100327>, (Apr. 2005), 1-7.

Budruk, Ravi, "PCI Express(r) Basics", (c) 2007, PCI-SIG, (2007), 40 pgs.

Hutchinson, Lee, "The SSD Revolution / An ARS Technica Feature", Solid-state revolution: in-depth on how SSDs really work, (Jun. 4, 2012), 1-27.

Jackson, Mike, et al., "PCI Express Technology, Comprehensive Guide to Generations 1.x, 2.x and 3.0", (c) 2012 by MindShare, Inc., (Sep. 2012), 181 pgs.

Morgan, Timothy P., "'Til heftier engines come aboard, HP Moonshot only about clouds", [online]. [retrieved on Apr. 9, 2013].

(56) References Cited

OTHER PUBLICATIONS

Retrieved from the Internet: <URL: http://www.theregister.co.uk/2013/04/09/hp_moonshot_server_analysis/>, (Apr. 9, 2013), 1-8.
Myslewski, Rik, "HP wants to help you mount a Moonshot", [onlline]. [retrieved on Nov. 3, 2013]. Retrieved from the Internet: <URL: http://www.theregister.co.uk/2013/11/02/hp_pathfinder_innovation_ecosystem_and_discovery_lab/>, (2013), 3 pgs.
Regula, Jack, "Using Non-transpatent Bridging in PCI Express Systems", PLX Technology Inc., (Jun. 1, 2004), 1-31.
Vahdat, Amin, "The Emerging Optical Data Center", OSA/OFC/NFOEC 2011, (2011), 3 pgs.
"U.S. Appl. No. 13/958,310, Advisory Action dated Mar. 14, 2016", 3 pgs.
"U.S. Appl. No. 13/958,310, Non Final Office Action dated Apr. 20, 2016", 24 pgs.
"U.S. Appl. No. 13/958,310, Response filed Feb. 16, 2016 to Final Office Action dated Dec. 16, 2015", 10 pgs.
"U.S. Appl. No. 14/189,275, Final Office Action dated Feb. 11, 2016", 23 pgs.
"U.S. Appl. No. 14/321,262, Advisory Action dated Apr. 10, 2017", 3 pgs.
"U.S. Appl. No. 14/321,262, Final Office Action dated Feb. 13, 2017", 27 pgs.
"U.S. Appl. No. 14/321,262, Non Final Office Action dated Aug. 4, 2016", 26 pgs.
"U.S. Appl. No. 14/321,262, Pre-Appeal Brief Request filed May 12, 2017", 5 pgs.
"U.S. Appl. No. 14/321,262, Pre-Appeal filed May 12, 2017", 5 pgs.
"U.S. Appl. No. 14/321,262, Response filed Mar. 30, 2017 to Final Office Action dated Feb. 13, 2017", 15 pgs.
"U.S. Appl. No. 14/321,262, Response filed Nov. 4, 2016 to Non Final Office Action dated Aug. 4, 2016", 16 pgs.
"U.S. Appl. No. 14/321,317, Non Final Office Action dated Mar. 16, 2016", 8 pgs.
"U.S. Appl. No. 14/321,317, Notice of Allowability dated Oct. 14, 2016", 2 pgs.
"U.S. Appl. No. 14/321,317, Notice of Allowance dated Jul. 18, 2016", 7 pgs.
"U.S. Appl. No. 14/321,317, Response filed Jun. 23, 2016 to Non Final Office Action dated Mar. 16, 2016", 14 pgs.
"U.S. Appl. No. 14/552,329, Non Final Office Action dated Jul. 20, 2016", 19 pgs.
"U.S. Appl. No. 14/552,329, Notice of Allowance dated Feb. 15, 2017", 5 pgs.
"U.S. Appl. No. 14/552,329, Notice of Allowance dated Oct. 28, 2016", 6 pgs.
"U.S. Appl. No. 14/552,329, Response filed Oct. 20, 2016 Non Final Office Action dated Jul. 20, 2016", 13 pgs.
"U.S. Appl. No. 14/949,518, PTO Response to Rule 312 Communication dated Oct. 14, 2016", 1 pg.
"Intelligent I/O (I2O) Architecture Specification", Publisher: I2O Special Interest Group; Version: Draft Revision 1.5, (Mar. 1997), 2 pgs.
"Intelligent I/O (I2O) Architecture Specification", Draft Revision, (Mar. 1997), 503 pgs.
U.S. Appl. No. 13/844,663, filed Mar. 15, 2013, Network Storage System Using Flash Storage.
U.S. Appl. No. 13/931,650, filed Jun. 28, 2013, Flash-Based Storage System Including Reconfigurable Circuitry.
U.S. Appl. No. 13/958,310, filed Aug. 2, 2013, Flash-Based Storage System Including Reconfigurable Circuitry.
U.S. Appl. No. 14/189,275, filed Feb. 25, 2014, Flash-Based Storage System Including Reconfigurable Circuitry.
U.S. Appl. No. 14/321,218, filed Jul. 1, 2014, Storage System With Flow Based Services for Flash Storage.
U.S. Appl. No. 14/453,105, filed Aug. 6, 2014, Cache Memory Management System and Method.
U.S. Appl. No. 14/552,329, filed Nov. 24, 2014, Cache Memory Management System and Method.
U.S. Appl. No. 14/321,317, filed Jul. 1, 2014, Method of Configuring a System for Flow Based Services for Flash Storage and Associated Information Structure.
U.S. Appl. No. 14/321,262, filed Jul. 1, 2014, Method of Flow Based Services for Flash Storage.

\* cited by examiner

NETWORK STORAGE SYSTEM USING FLASH STORAGE

CLAIM OF PRIORITY

This Application is a Divisional of U.S. patent application Ser. No. 13/844,663, filed Mar. 15, 2013, which is incorporated herein by reference, and the benefit of priority of which is claimed herein.

TECHNICAL FIELD

This patent document pertains generally to data processing, and more particularly, but not by ways of limitation, to assembly and storage of large data sets on network storage systems using flash storage.

BACKGROUND

The large amounts of information generated daily challenge data handling facilities as never before. In the context of today's information generation, data is being generated at rates perhaps thousands or tens of thousands of times greater than was the data-generation rate in the 1990s. Historically, large volumes of data sparked explosive growth in data communications. Responses to growing amounts of data generation centered on improving the movement of data based in increased transmission data rates to enhance throughput in communication channels. For instance, transmission pipelines grew from a few tens of megabits-per-second (Mb/s) transmission rates to several tens of gigabits-per-second (Gb/s) rates during the 1990s.

In the same period, typical storage devices, such as hard disk drives (HDDs), when amassed in sufficient numbers, might accommodate large volumes of data, but the rates at which data could be stored and retrieved have not scaled at the same rate as the volume of data stored on the devices has increased. Data access rates for HDDs are at similar orders of magnitude today as they were in the '90s.

Fundamental storage subsystems have not integrated technology to enable scaling of effective data storage at the same rate that data generation is growing. Hence the challenge to systems handling large volumes of data is not likely to be alleviated by the combination of contemporary HDD technology with high-speed data transmission channels. In order to handle and manage big data, information processing facilities will be pressured to utilize larger volumes of storage with higher performance rates for capturing and accessing data.

BRIEF DESCRIPTION OF DRAWINGS

Some embodiments are illustrated by way of example and not limitation in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present invention may be practiced without these specific details.

Environment

Much of the drawback of current storage subsystems has to do with limitations created by bottlenecks in data transport bandwidth inherent in the storage devices themselves. For example, disk drives have significant limitations in latency, seek times, and data transfer rates, which for the purposes of this application these quantities will be cumulatively referred to as the "access time." The total amount of storage that may be provided by HDD may approximate the expectations of storage capacities required by big data users, but the ability to provide high performance data throughput at those storage capacities is limited by the use of HDD technology and the inherent data access limitations.

Although HDD devices can store large quantities of data with high reliability, typical HDD devices lack access speeds high enough to directly service the storage requirements of client devices having high data rate requirements. When high-performance network data transmission technologies are coupled to a large capacity storage subsystems based on HDD memory, there is a performance mismatch between the data rates sustainable by the network attached devices and the HDDs that caching alone does not remedy to fulfill the performance levels required by big data.

Redundant Paths

Figure 1:
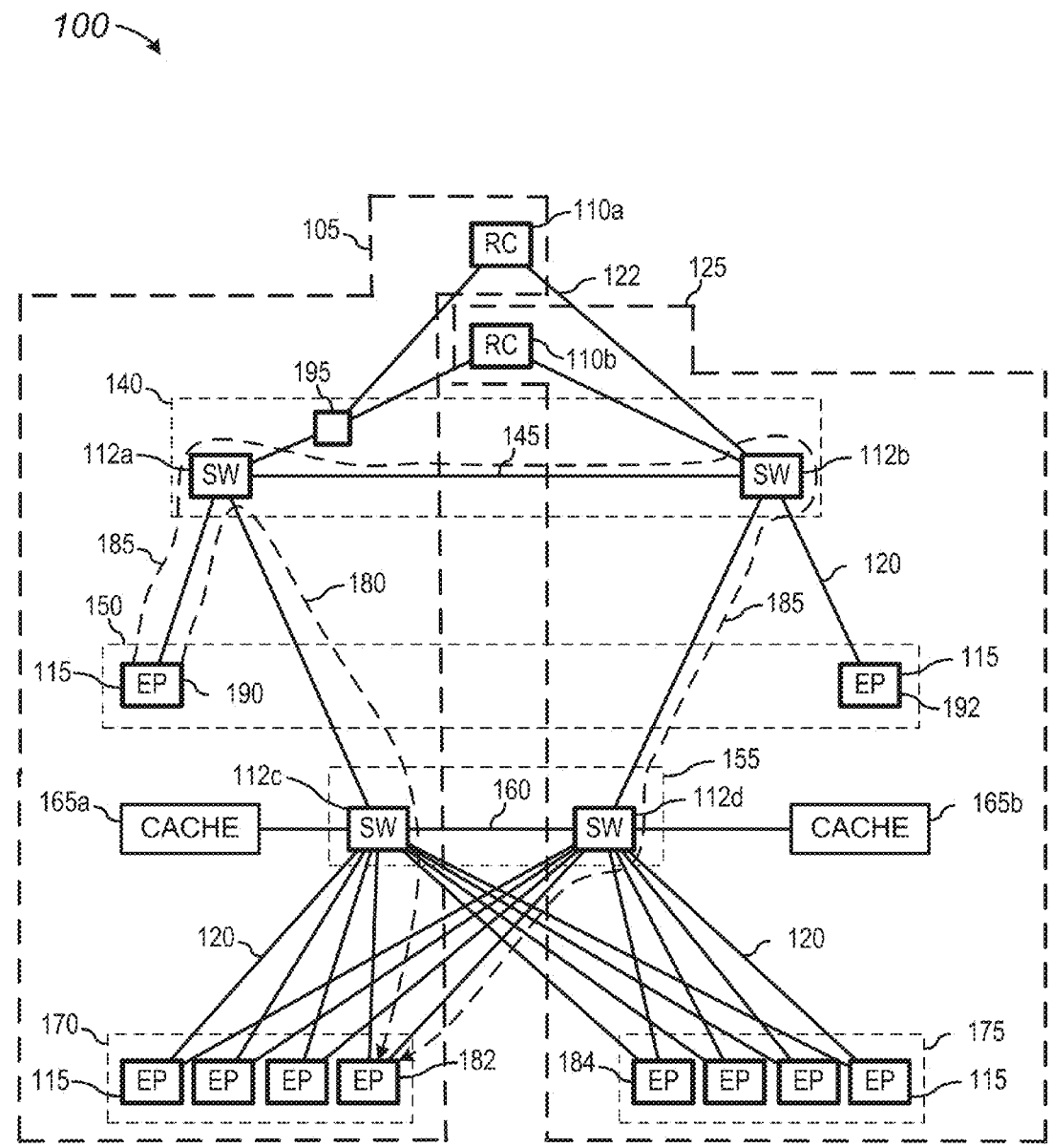
FIG. 1 is a diagrammatic representation of a hierarchical interconnection fabric including redundant paths, as may be used in example embodiments.

FIG. 1 is a diagrammatic representation of a hierarchical interconnection fabric 100 including redundant paths, as may be used in example embodiments. A fabric is composed of point-to-point links that interconnect a set of components. According to example embodiments, a single or first fabric instance 105 can refer to a hierarchy including one or more root complexes RC 110, and one or more endpoints EP 115 interconnected with point-to-point links 120.

Redundant paths may be created by coupling crossover paths from point-to-point links 120 between two fabric instances such that some or all of the first fabric instance 105 may be coupled to some or all of a second fabric instance 125. In this way, components at endpoints and/or root complexes associated with the first fabric instance 105 may conduct transactions with components associated with endpoints 115 and/or further root complexes 110 associated with the second fabric instance 125 even though certain point-to-point links 120, endpoints, and root complexes 110 may become unavailable due to failure or transaction congestion.

In continuing accord with example embodiments, the root complex 110 can denote the root of an interconnected I/O hierarchy that connects a CPU 130 and local memory 135 to I/O components coupled by the interconnection fabric. A root complex 110 may support transactions to or from one or more ports where each port defines an interface to a portion of the hierarchical interconnect fabric. Accordingly, one or more root complexes RC 110a,b may have redundant connections to a first set of endpoints 140, which are coupled to each other through a first crossover path 145. The first set of endpoints 140 can be coupled to a second set of endpoints 150 and a third set of endpoints 155. The third set of endpoints 155 is coupled to one another by a second crossover path 160, as well as to one or more cache modules 165a,b containing cache memory. The third set of endpoints 155 can also be coupled to a fourth set of endpoints 170 and a fifth set of endpoints 175.

According to certain example embodiments, an interconnection scheme is based on the hierarchical interconnection fabric 100 can interconnect components or devices, such as a cache module 165 for example, with further devices (not shown) as endpoints of each connection. An endpoint can be a type of device that may be a requester or completer of a transaction within the interconnection scheme. According to the placement of point-to-point links 120 and the interconnection of certain types of endpoints, a hierarchy of component connections may be established at the endpoints.

For example, the second set of endpoints 150 may be I/O circuits that can be connected to external networks and the third set of endpoints 155 may be reconfigurable data transfer circuits. The first set of endpoints 140 may be connection points establishing connections for transactions between I/O circuits associated with the second set of endpoints 150 and the reconfigurable data transfer circuits of the third set of endpoints 155. By maintaining certain types of components at certain levels of endpoint groupings, a hierarchy of endpoints may be established. By way of further example, the fourth set of endpoints 170 and the fifth set of endpoints 175 may be storage devices that when coupled to the third set of endpoints form a storage tier at a further level of an endpoint hierarchy.

The first crossover path 145 provides a redundant path capability between endpoints in the second set of endpoints 150 and the fourth set of endpoints 170. For instance, a first endpoint 190 in the second set of endpoints 150 may connect through a first redundant path 180 to a completer endpoint in the fourth set of endpoints 170. Alternately, the first endpoint 190 in the second set of endpoints 150 may alternatively connect to a second redundant path 185 to the same completer endpoint in the fourth set of endpoints 170 as was the case for the first redundant path 180. By utilizing the first crossover path 145 to couple the first and second endpoints in the first set of endpoints 140 the second redundant path 185 couples between the second endpoint of the first set of endpoints 140 and the second endpoint of the third set of endpoints 155 to complete a connection to the completer endpoint in the fourth set of endpoints 170.

The second redundant path 185 may be utilized in the case, for example, that the first endpoint in the third set of endpoints 155 were to become unavailable due to either a component failure or perhaps from congestion due to high volumes of data stemming from a previous transaction. By a simple application of symmetry, the first redundant path 180 and the second redundant path 185 might be thought of as being rotated or reflected about a vertical axis down the center of the figure (not shown) such that the second endpoint in the second set of endpoints 150 and a first (completer) endpoint in the fifth set of endpoints 175 would be coupled to one another by either the mirrored first redundant path 180 or the mirrored second redundant path 185 (not shown). Application of this symmetric case of redundant paths would provide a coupling of the second endpoint in the second set of endpoints 150 to the completer endpoint in the fifth set of endpoints 175 in the event that the second endpoint in the third set of endpoints 155 were to become unavailable.

A similar situation for providing redundant paths may be visualized by applying the second crossover path 162 provide alternative connections between the first endpoint 190 in the second set of endpoints 150 to a completer endpoint in the fifth set of endpoints 175. The second crossover path 162 would alternatively provide a path for coupling the first endpoint in the fifth set of endpoints 175 through either of the endpoints in the third set of endpoints 155. By application of alternate path connections, similar to that described above for the first redundant path 180 and the second redundant path 185, a similar pair of redundant paths would support the coupling the first and 190 in the second set of endpoints 150 to the first endpoint in the fifth set of endpoints 175.

These redundant paths also allow for data to be routed to or from any root complex to any endpoint or cache memory module even if there is a path or endpoint that becomes unavailable due to a component failure or congestion, for example. For example, if the first endpoint in the first set of endpoints 140 were to become unavailable, the first root complex 110a may take advantage of an alternate point-to-point link 120 to the second endpoint in the first set of endpoints 140 and gain access to either the fourth set of endpoints 170 or the fifth set of endpoints 175 through use of either of the endpoints in the third set of endpoints 155 and the second crossover path 160 in a fashion similar to that described above in regard to the first redundant path 180 and the second redundant path 185. In addition, if a first path from an endpoint to a further endpoint or from a root complex to any endpoint is operating at a full capacity, a redundant path may be incorporated in order to boost performance by balancing the load between interconnection fabrics.

Figure 4:
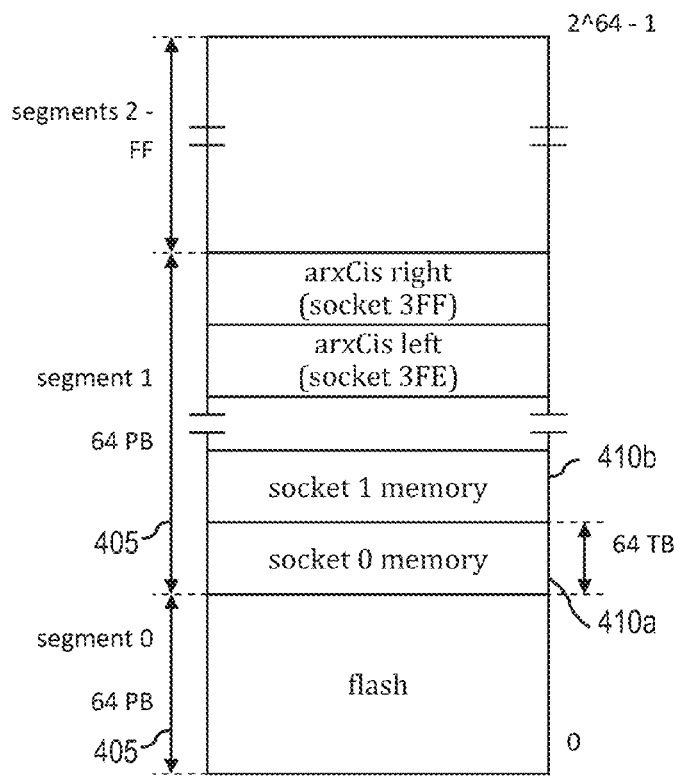
FIG. 4 depicts a peer-to-peer address configuration space, as may be used in example embodiments.

Various groupings of endpoints have been described as forming a hierarchy within the interconnection fabric. Enumeration is a process initiated by a master processor or server to set up a description of a tree hierarchy corresponding to the interconnection fabric. The enumeration process may start from the tree root (root complex) and progress down to the leaf nodes of the interconnection fabric. According to some example embodiments, a serial communication and connection specification or a serial bus standard such as the peripheral component interconnect express (PCIe) a configuration process may be implemented as boot software is executed to discover endpoints and assign identifiers to discovered endpoints using a depth-first sequence. Once discovered, these endpoints can be configured along with further PCIe components, such as fabric switches and FPGAs (not shown), and associated cache modules 165a,b; so that packets can be routed per the enumerated identifiers as well as the address map described below (FIG. 4). All levels of nodes or endpoints within the tree are named according to the level they reside at. The enumerated hierarchy descriptors are stored in tables. Only the root complexes RC 110 have a map of the tree hierarchy. The identities of data packets may have to be translated from the TCP/IP space to this address naming space of the interconnection fabric (e.g., PCIe address configuration space).

A further component of redundancy in accordance with some embodiments, is the use of a mechanism known as a "nontransparent bridge" (NTB) 195. The NTB 195 allows packets of data to traverse from the tree of one interconnection fabric to another tree in a parallel interconnection fabric. NTB's 195 typically include registers that map the address space of one tree to the address space of another tree and translate relevant fields in packets as they traverse from one tree to another. Since each CPU die typically has its own root complex and there can be multiple CPU die in a subsystem, NTB's 195 can be used to allow multiple CPU die to connect to devices throughout the subsystem. The first root complex 110a and the second root complex 110b are coupled to inputs of the NTB 195. An output of the NTB 195 is coupled to the first endpoint of the first set of endpoints 140.

According to example embodiments, the NTB 195 may be programmed to gate the second input coupled to the second root complex 110b in nominal operation. In the event of a CPU failure in the first root complex 110a in association with the first fabric instance 105, software running on a CPU in the second root complex 110b can re-configure the NTB 195 connection to become "transparent," thus making the previous nontransparent connection for the second root complex 110b to become viable for managing the routing of data packets through the first fabric instance 105. Any components in the first fabric instance 105 that were coupled to the first root complex 110a become part of the interconnection fabric managed by the second root complex 110b after reconfiguring the NTB 195.

Figure 2:
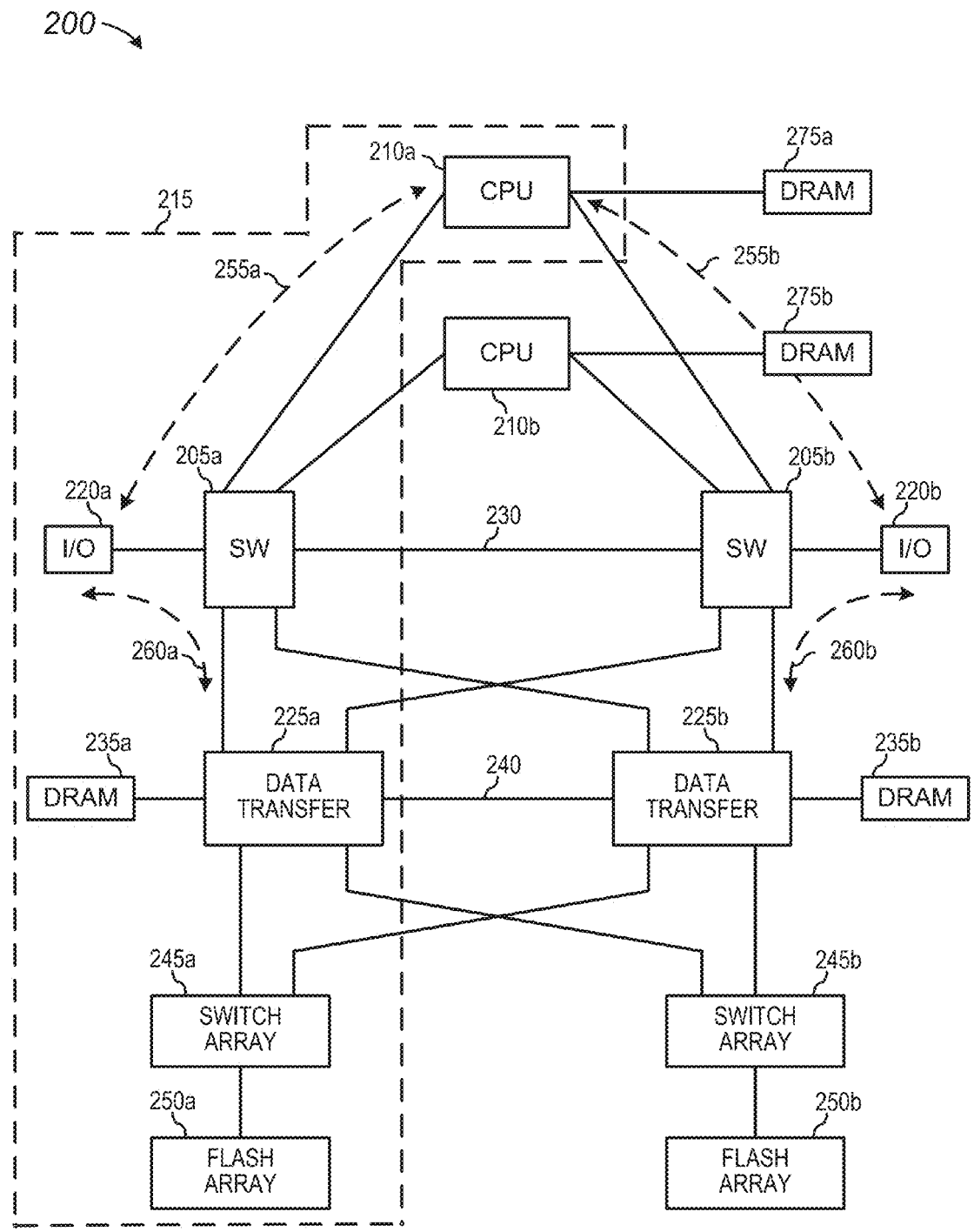
FIG. 2 is a diagrammatic architecture level representation of a storage system, according to example embodiments.

FIG. 2 is a diagrammatic architecture level representation of a storage system 200, according to example embodiments. This architect sure level representation of a storage system corresponds to the hierarchical interconnection fabric of FIG. 1. Root complexes 210a,b (CPUs) are each coupled to a first set of switches SW 205a,b. The root complexes 210a,b can include one or more interconnection fabric ports or connection bridges, coupling to the interconnection fabric, starting with the first set of switches 205a,b. The interconnection fabric can include an array of switches assembled in a tree structure or similar array as outlined in FIG. 1 in regard to endpoints. The array of switches can connect endpoints to one another and to the root complexes 210a,b. Such an array of switches may also be referred to as a switch fabric 215.

According to some example embodiments, a switch 205a may appear as a bridge at an input port of the switch 205a and have one or more outputs, each appearing as a further bridge connected to the bridge at the input. By incorporating this array of bridges, switches 205a,b can create multiple endpoints out of one endpoint and thus allow one endpoint to be shared with multiple devices.

An interconnection fabric can be configured with a peer-to-peer (P2P) connectivity scheme, according to example embodiments. Given the point-to-point nature of PCIe, switches are used to allow a single device to communicate with multiple devices. Switches route packets either by address or by destination identifier (described below). The switches within the switch fabric 215 establish data communication paths between endpoints connected at the boundaries of the switch fabric 215 in a manner similar to the connectivity description of endpoints in FIG. 1. This point-to-point communication between endpoints may be accomplished with a serial communication and connection specification or the PCIe standard as the management layer. PCIe is a high-speed serial computer expansion bus standard that implements improvements over predecessor connection standards such as the peripheral component interconnect (PCI) standard and the accelerated graphics port (AGP) standard.

I/O circuits 220a,b can couple the switches 205a,b to external networks (not shown). The switches 205a,b may be coupled to the reconfigurable data transfer components 225a,b as well as to one another. The coupling between the switches 205a,b may be provided by a first crossover path 230 similar to that described for the first set of endpoints 140 (FIG. 1). Each of the switches 205a,b couples to both reconfigurable data transfer components 225a,b. The first crossover path 230 and the cross coupling of the switches 205a,b to each of the two reconfigurable data transfer components 225a,b can establish the cross coupling and redundant paths, as well as the ensuing capabilities, as described above in relation to first set of endpoints 140 and the third set of endpoints 155 (FIG. 1).

The reconfigurable data transfer components 225a,b each coupled to a respective dynamic random access memory (DRAM) 235a,b as well as to one another through a second crossover path 240. The reconfigurable data transfer components 225a,b are also each cross coupled to a first switch array 245a and a second switch array 245b. The cross coupling of the reconfigurable data transfer components 225a,b to the DRAMs 235a,b and to one another, provides the redundant paths capabilities described above in FIG. 1. The first switch array 245a and the second switch array 245b are coupled to a first flash array 250a and a second flash array 250b respectively.

Either of the external networks may provide a transfer request to the I/O circuits 220a,b which can be propagated to the root complexes 210a,b as requests 255a,b. The requests are in turn propagated by the root complexes 210a,b to the switch fabric as respective data transfer requests. According to an example embodiment, a data transfer request made by the root complex can establish a point-to-point connection across the P2P switch fabric by establishing a path through particular switch elements in the fabric. The root complex may be involved in initiating a path through the switch fabric and thereafter data transfers from endpoint to endpoint may be conducted without direct intervention by the CPU in each data packet of the transfer. For example, a data sourcing endpoint such as the first I/O circuit 260a may be coupled to a data receiving endpoint such as the first flash array 250a by a transfer request initiated with the first root complex 210a. The transfer request initiated by the first root complex 210a may establish a memory mapped input-output (MMIO) connection between the two endpoints and thereafter large amounts of data may be transferred between the endpoints without further CPU involvement.

Figure 3:
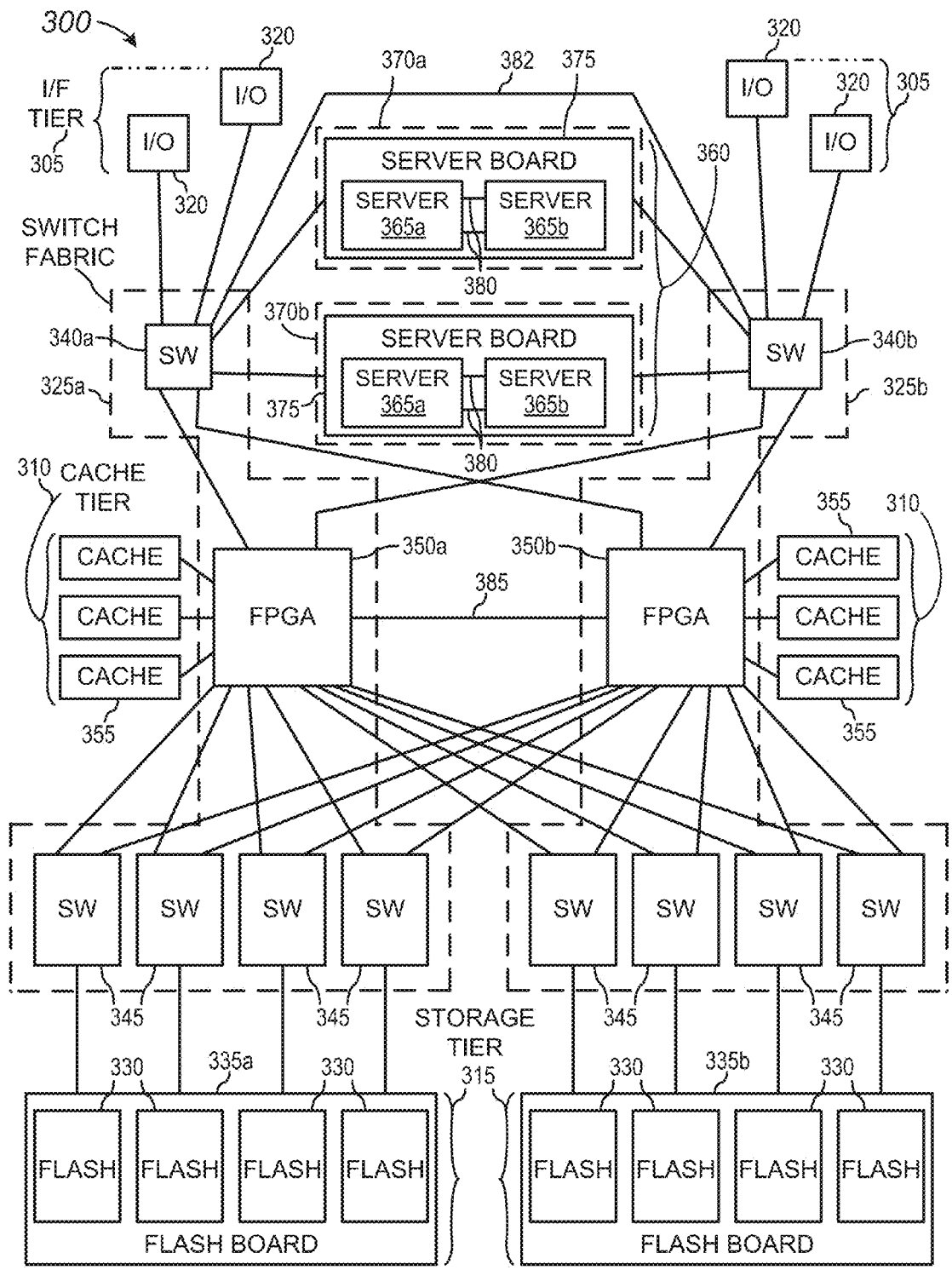
FIG. 3 is a block level representation of a storage system, according to example embodiments.

FIG. 3 is a block level representation of a storage system 300 in accordance with some embodiments. The architecture includes three tiers, namely the network interface tier (I/F Tier) 305, the cache tier 310, and the storage tier 315. Each of the three tiers can be coupled together by an interconnect layer.

Within the network interface tier 305 of certain embodiments, I/O circuits 320 provide high-speed connections from external networks (not shown) to the interconnect layer or switch fabric 325. The I/O circuits 320 are coupled to external networks, such as InfiniBand, Fibre Channel, serial attached SCSI (SAS), and/or Ethernet, for example. The I/O circuits 320 connect these external networks to the switch fabric 325. The I/O circuit 320 can provide a protocol conversion and still produce high-speed data communication between the external networks and the switch fabric 325.

The I/O circuits may be coupled by the switch fabric to the storage tier 315 or the cache tier 310. The storage tier 315 may be composed of flash circuits 330 arranged on a flash board 335. The switch fabric may be implemented with an array of switches, including I/O circuit switches 340 coupled to the I/O circuits and flash switches 345 coupled to the flash board 335. The cache tier can be implemented with reconfigurable circuitry. In some embodiments, the reconfigurable circuitry comprises a field-programmable gate array (FPGA) 350, which is interposed in the switch fabric 325 to couple cache modules 355 to various endpoints under the command and direction of the FPGA 350.

A server layer 360 coupled to the switch fabric 325 includes CPUs or servers 365a,b within the root complexes 370a,b that act as a control and management agent for respective portions of the switch fabrics 325a,b. The server layer 360 may be for example a server board 375.

In some embodiments, each server in the server layer may be coupled to a respective switch fabric 325a,b. Each server and each respective switch fabric may be cross coupled to one another. Each server board 375 may include first crossover paths 380 coupling the servers 365a,b to one another. A second crossover path 380 can couple the first switch 385a in the first switch fabric 325a to the second switch 385b in the second switch fabric 325b. A third crossover path 380 can couple the first FPGA 350a in the first switch fabric 325a to the second FPGA 350b in the second switch fabric 325b. Redundant paths, as described above, with reference to FIG. 1, can provide access to a parallel or mirrored paths according to cross coupling between the switch fabrics 325a,b.

In redundant switch fabrics, such as the first switch fabric 325a and the second switch fabric 325b, there may be a server element (or "server") within the root complex associated with each portion of the redundant switch fabric. According to certain embodiments of redundant switch fabric, two servers may be coupled to the switch fabric and reside on a server board and be directly coupled to one another by direct connections implemented on the server board. The direct connections between servers are primarily for communication and management considerations between the servers and additionally may operate as a cross-coupled transmission path for data throughput. Various elements within the switch fabric associated with respective servers may be connected to a corresponding element in the complementary (parallel) switch fabric and thus provide redundancy by establishing paths in another switch fabric when a portion of a path is not available in the first switch fabric.

For example, a first crossover path 380 can connect a first I/O circuit switch 390a in the first switch fabric 325a with a second I/O circuit switch 390b in the second switch fabric 325b and a second crossover path 380 may connect a first FPGA 350a to a second FPGA 350b located in the first switch fabric 325a and the second switch fabric 325b respectively. Cross coupling may occur between the respective first and second I/O circuit switches 340a,b and the first and second FPGAs 350a,b as well as between the first and second FPGAs 350a,b and the first and second flash boards 335a,b of the storage tier. Each of these cross coupling connections establish a further crossover point between the first switch fabric 325a and the second switch fabric 325b. The crossover paths can cross coupling described here operates in a similar fashion to the same elements described above in relation to FIGS. 1 and 2 and the establishing of redundant paths.

The storage tier can be composed of storage modules (e.g., memory elements) and implemented with flash memory or any persistent solid-state memory technology that provides data-access performance suitable for direct or speed buffered connection to data from external network environments. According to some embodiments, flash modules containing flash memory technology can be organized in the storage tier. Yet, the flash module connects to the switch fabric with a single connection and operates like a single-ended source and sink (receiver) of data. Flash module access times may also exceed the access performance of HDD technology by several decimal orders of magnitude.

The cache tier can be positioned between the network interface tier and the storage tier. The cache tier can be connected through the switch fabric 325 to both the I/O circuits 320 in the network interface tier and the storage modules 395 in the storage tier 315. The cache tier can be considered as an intermediate storage layer to temporarily store data that ultimately transitions from the I/O circuit 260a,b to storage modules or vice versa. In certain embodiments, the cache tier 310 includes individual cache modules 355, each having DRAM for cache storage and flash memory for backup in case of power loss, for example.

Reconfiguration for Offload and Cache Management

Reconfigurable circuits, which may be FPGAs 350a,b in typical example embodiments, are used to offload the software-based processing performed by the servers in the root complexes 310a,b during data transfers in read and write operations. The FPGAs 350a,b use reconfigurable hardware circuits for read and write data transfers that are faster than the equivalent data transfer software executing on a processor. The CPU associated with the FPGA in the interconnection fabric or a Master CPU may be involved in providing instructions to configure the FPGA to handle the offloading of data transfers. The FPGA is configured by code executing on the CPU at boot up and may be reconfigured anytime the component configuration in the system is altered (i.e., anytime there is a change in the configuration of memory devices). The FPGAs 350a,b also manage data caching (below).

The offloading of data transfer software executing on any CPU to the FPGA involves the FPGA being configured to perform translations of logic unit number (LUN) and logic block address (LBA) in the iSCSI domain into PCIe configuration addresses to transfer data to flash memory. Data addresses, such as those involved in the iSCSI protocol and maintained in the Internet environment, are managed in terms of LUNs and LBAs. However, in the domain of storage devices maintained in the PCIe P2P connectivity environment, addresses corresponding to the storage devices are managed according to the PCIe address configuration space (FIG. 4 below). A (master) server or CPU in the system executes boot up software that determines the size and location of all data structures utilized in an address translation and configures the FPGA with this information. The configuration process of FPGAs includes populating tables with address conversion information for establishing LUN maps and LBA maps to convert data addresses from the iSCSI standard to flash memory addresses (FIGS. 5 and 6 below), for example. Address configuration space for is determined according to the enumeration process (above). Once the enumeration process has discovered endpoints in the switch fabric the FPGA can be configured with the tables and mappings that provide LUN and LBA translation to PCIe addresses and will.

More particularly, a system in accordance with some embodiments reduces processor, i.e. CPU and software, involvement and intervention in the control and throughput of dataflow between an external network environment and the storage system. The system receives I/O requests from the external network. Typically, a basic amount of software must execute in a CPU before a given I/O request may be directed to an appropriate read or write hardware procedure (e.g. PCI read or write cycles) to be carried out. According to particular embodiments, most if not all of the typical software execution on the CPUs in the common I/O request types may be bypassed through offloading the processing of these requests with the FPGAs 350*a,b*. In common cases of reads or writes to blocks or data objects, the CPU is bypassed entirely.

For instance, the iSCSI approach to data transfer between remote devices requires that the fundamental SCSI commands for controlling the I/O requests each be encapsulated in various levels of IP or TCP layers. Each one of these layers of encapsulation must be "unwrapped" by the CPU and DRAM in the software-intensive approach to I/O protocol servicing. This iSCSI approach further exacerbates the problem under the software-intensive approach to I/O processing. In typical example embodiments, iSCSI read and write commands are offloaded to the FPGA for processing. All other command types are processed in the server according to the iSCSI target software.

The storage subsystem only offloads read and write commands to the FPGA. The I/O circuit sends all other command types to the iSCSI target software that has its own dedicated descriptor rings in server memory. The iSCSI target software executes in the CPU. Descriptor rings, according to typical example embodiments, are a circular-natured portion of memory that may be shared between a processor and a PCIe device to buffer information handed off between the two components during data transfers. Particular descriptor rings may be receive rings and transmit rings, for example. ISCSI allows multiple PDUs to be placed in a single TCP payload. The NIC places the entire TCP payload on the FPGA's descriptor ring only if all PDUs contained in that payload encapsulate either a read or a write command—if any other command types are inter-mixed with read or write commands, then the NIC will place the entire payload on the iSCSI target descriptor ring.

The FPGA manages the caching of data involved in read and write transactions. The instructions provided to the FPGA from the execution of configuration programs operating in the CPU (above) can configures the FPGA to implement cache policies. Following the indexing of the LUN map and the LBA map, the translated PCIe address is used to determine an address match in cache tags maintained within the FPGA. If there is a cache tag match, the data sought in the data transfer request is resident in the cache and may be provided from cache. The access performance for cash is significantly greater than the access times for flash memory. Each cache hit (cache tag match) in a data transaction significantly improves performance compared to accessing flash memory directly. In this way data transactions may be completed entirely from cache and accomplished significantly faster than would acquiring the data from flash memory. In this way, as much of the data involved in read and write transactions as possible is provided from cache and cached respectively. In certain example embodiments, it may be possible to accomplish nearly all data transactions from cache.

FIG. 4 depicts a peer-to-peer address configuration space 400 produced according to the enumeration process conducted in certain example embodiments. Address ranges within the interconnect address space 400 are assigned during the enumeration process. This example P2P Memory space is divided into 256 64PB segments. A range of the address space in a first segment, labeled segment 0, corresponds to flash memory 405. Segment 1 contains all memory on any CPU socket (e.g., socket 0 memory and socket 1 memory 410*a,b*) and all memory attached to left and right FPGA's (cache modules 355*a,b*). Segments 2 and above contain memory exported by other devices and may also contain any address-mapped interrupts. The I/O devices are considered endpoints and get included in the address configuration space in the socket 0 memory and socket 1 memory 410*a,b*.

Thus, the cache module is accessible by any other peer component through memory-to-memory transfers utilizing the interconnect address space 400. This is possible due to the enumeration process including the cache modules associated with the FPGA in the same manner that all other peer devices associated with the switch fabric are enumerated.

The reconfigurable circuitry, i.e. FPGAs, store the following offload and cache management data structures in the cache module:
  Cache data.
  Cache tags.
  NIC receive and transmit descriptor rings for offloaded
     protocols.
  NIC receive and transmit packet buffers.
  Protocol offload maps (one each for Internet small computer system interface [iSCSI], network file system [NFS], common Internet file system [CIFS], et. al.).
  Code, stack, and global data used by programs executing on the compute engine.
  Parameter block.

The resulting cache management information is written to configuration registers within the FPGA. The parameter block contains all boundaries, sizes, and versions of data structures necessary for correct re-construction of all data structures when a cache module is moved to another system.

Figure 5:
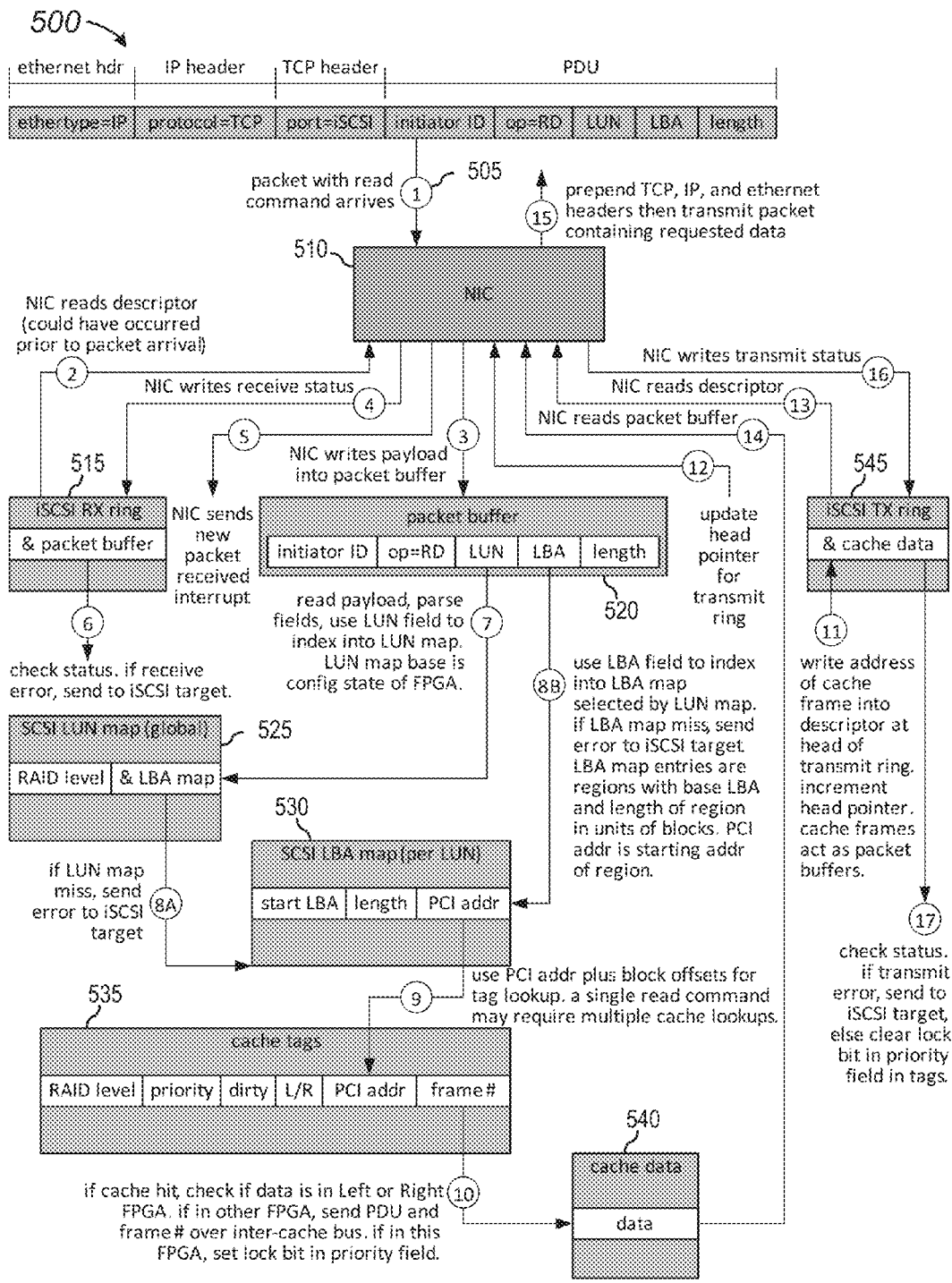
FIG. 5 is a block diagram illustrating data structures related to processing a SCSI read command, according to an example embodiment.

FIG. 5 is a block diagram illustrating data structures 500 related to processing a SCSI read command, according to an example embodiment. An ethernet packet including a read command 505 arrives at a NIC 510. The NIC 510 is coupled to and iSCSI receiver ring (iSCSI RX ring) 515 and a packet buffer 520. The packet buffer 520 is coupled to a SCSI LUN map 525. The SCSI LUN map 525 is coupled to a SCSI LBA map 530. The SCSI LBA map 530 is coupled to a cache tags table 535, which in turn is coupled to cached data 540. The cached data 540 is coupled to the NIC. The iSCSI receiver ring 515 is coupled to an iSCSI transmit ring (iSCSI TX ring) 545.

Figure 6:
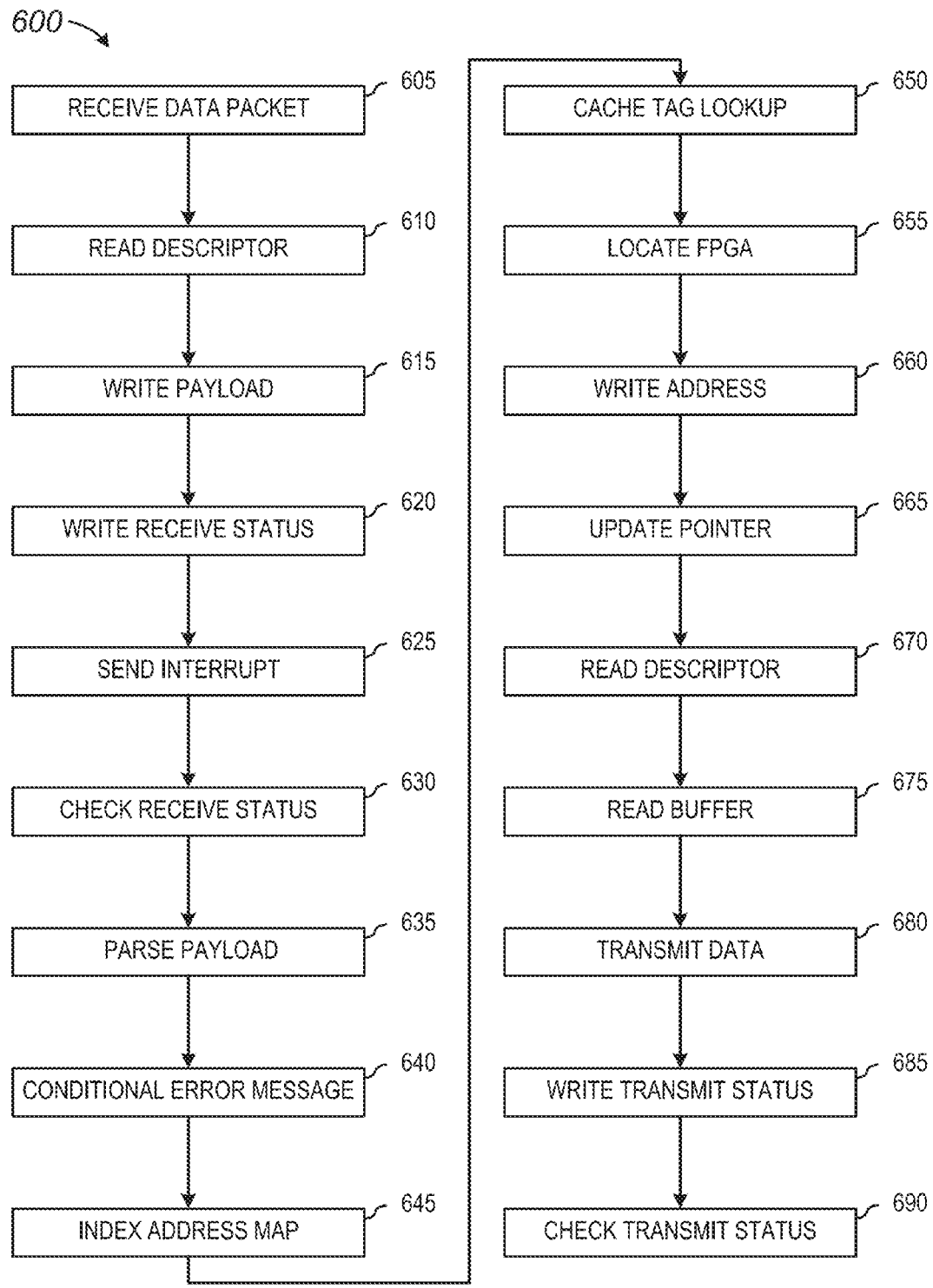
FIG. 6 is a flow diagram illustrating a sequence of events in processing a SCSI read command, as may be used in example embodiments.

FIG. 6 is a flow diagram illustrating a sequence of events in processing a SCSI read command 600, starting from the arrival of the read command to the transmission of the packet containing the requested read data. With the exception of the arrival of the packet containing the read command, all actions are performed by either the NIC (and are explicitly indicated as such) or by logic in the FPGA. Performing operations relating to the read command in the reconfigurable circuits of the FPGA at hardware speeds, which is significantly faster than the executing software performing the same read operation on the CPU. Many of the data transfer steps involved in the read process may include interrupts and signal handshaking within the transfer protocol in order to accomplish the read transfer. This level of involvement by the software executing on the processor reduces the effective speed of the data transaction.

A TCP-IP packet 605 including a read command arrives (1) 605 at the network interface tier, and more specifically, at the input of a NIC. In some embodiments, the I/O circuits comprise network interface cards (NICs). The NIC reads (2) 610 the descriptor and forwards that to the iSCSI receiver ring (refer to descriptor rings above) and packet buffer 520. The NIC writes (3) 615 the payload into the packet buffer 520. The NIC writes (4) 620 the receive status into the iSCSI receiver ring 515. The NIC sends (5) 625 a new-packet-received interrupt. Next, the receive status is checked (6)

630 and if there is a receive error that is sent to the iSCSI target. Next, the payload is read (7) 635 and the header fields parsed.

The LUN field is read and used to index into the LUN map 525. The LUN base is mapped to a fixed state of the FPGA. If there is a LUN map miss, send (8A) 640 an error indicator to the iSCSI target. Next, the logic block address LBA field is read. The LBA field is used to index (8B) 645 into the LBA map 530, which was determined according to the LUN map. If there is an LBA map miss, and error indicator is sent to the iSCSI target. LBA map entries are regions with a base LBA and region length indicated in units of blocks. The PCI is the starting address of the region.

From the SCSI LBA map 530, determined by the LUN, the PCI address plus block offsets are used (9) for a tag lookup 650 in the cache tags table 535. A single read command may require multiple cache lookups. If there is a cache hit, check (10) 655 whether the data is located in the left or right FPGA 350 a,b. If the data is located in the opposing FPGA, send the PDU and frame number over the inter-cache bus 399. If the data is located in the instant FPGA, set the lock bit 550 in the priority field 555.

Next, the cache frame address is written (11) 660 into a descriptor 560 at the head of the transmit ring 545. The head pointer 560 is incremented and the cache frame 565 may serve as packet buffers. The head pointer 560 for the transmit ring 545 is updated (12) 665. The NIC 510 reads (13) 670 the descriptor 560 from the iSCSI transmit ring (and cache data) 545. Next, the NIC reads (14) 675 the packet buffer 520 from the cached data 540.

TCP, IP, and ethernet headers are prepended (15) to the data read from storage in the headers and retrieved data are transmitted 680 as a packet containing the requested data. The NIC writes (16) 685 a transmit status to the iSCSI transmit ring 545. The status is checked (17) 690, and if a transmit error is detected and error indication is sent to the iSCSI target. If no transmit error is detected, the lock bit 550 is cleared from the priority field in the tags cache.

The iSCSI target software may need to be kept informed of the existence and progress of offloaded read and write commands so it can maintain its data structures including performance counters.

Caching Hardware

Figure 7:
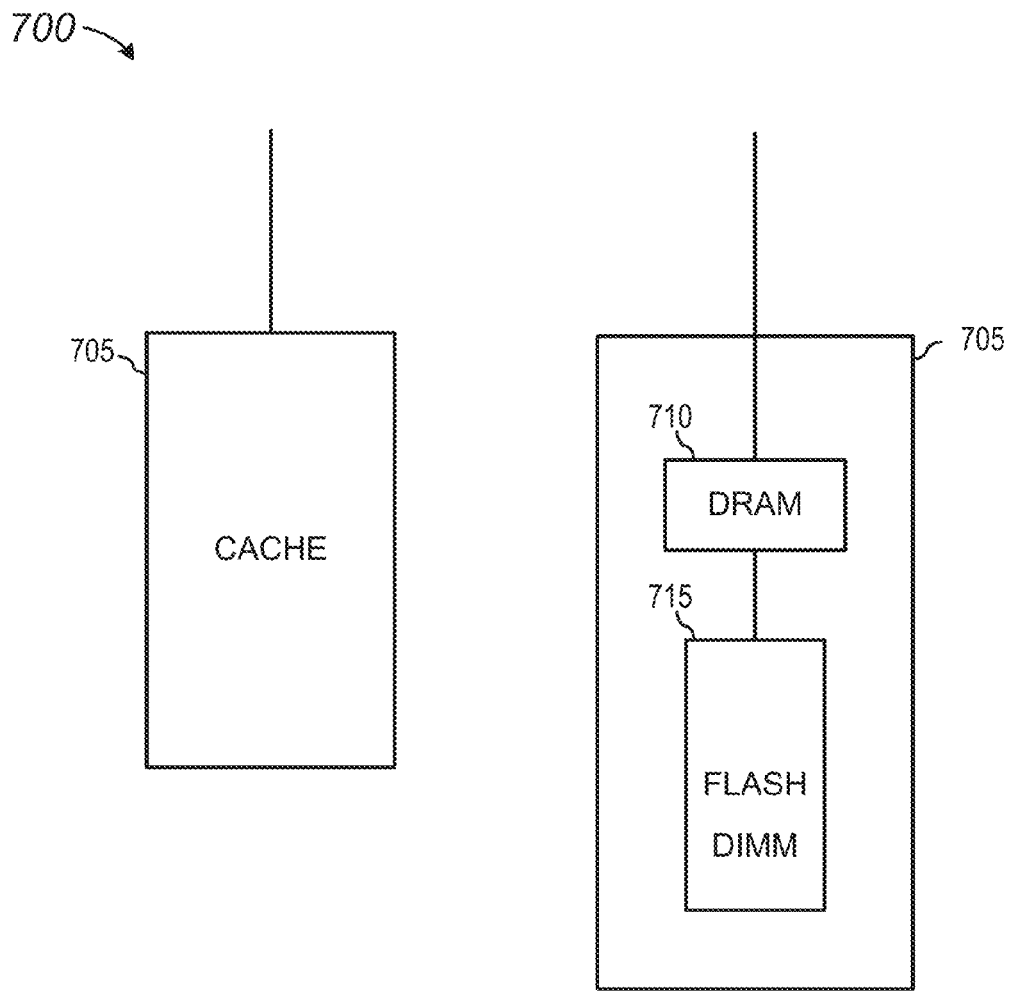
FIG. 7 is a block diagram depicting a dual inline memory module containing DRAM and flash memory, as may be used in example embodiments.

FIG. 7 depicts a dual inline memory module containing DRAM and flash memory that can be plugged into a standard DDR3 DIMM socket. In some embodiments, during operation the module behaves similar to a standard DDR3 DRAM DIMM, however, upon the occurrence of the events specified below, data is copied between DRAM and flash. The entire contents of on-board DRAM are written to flash upon the occurrence of any of the following:

If configured to do so: A drop in supply voltage is detected by an on-board circuit. Super-capacitors supply power to the Cache module to complete this operation.

A SAVE command is received via the I2C interface on the DIMM socket.

An interrupt is received via a pin on the DIMM socket.

The contents of flash are written to DRAM upon occurrence of any of the following events:

If configured to do so: After power up if a valid saved image is detected in flash.

A RESTORE command is received via the I2C interface on the DIMM socket.

This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
   first I/O circuitry;
   a first server configured to provide a root complex;
   first reconfigurable circuitry;
   an array of flash storage devices;
   first cache storage; and
   a first hierarchical serial interconnect network that includes the root complex, the first reconfigurable circuitry, a switch circuitry, and a plurality of serial data communication paths;
   wherein the first hierarchical serial interconnect network includes a network interface tier that includes first switch circuitry and a serial communication path that interconnects the first switch circuitry and the first I/O circuitry, which is coupled as an endpoint to the network;
   wherein the first hierarchical serial interconnect network includes a storage tier that includes second switch circuitry and a serial communication path that interconnects the second switch circuitry and a flash storage device of the array of the flash storage devices, which is coupled as an endpoint to the network;
   wherein the first hierarchical serial interconnect network includes a serial communication path that interconnects the first switch circuitry and the first server;
   wherein the first hierarchical serial interconnect network includes a serial communication path that interconnects the first reconfigurable circuitry and the first switch circuitry; and
   wherein the first hierarchical serial interconnect network includes a serial communication path that interconnects the first reconfigurable circuitry and the second switch circuitry;
   wherein the first reconfigurable circuitry is coupled to transfer data between the first cache storage and the first switch circuitry and between the first cache storage and the second switch circuitry;
   wherein the first server is configured to designate a first interconnect address space for use during transfer of data over the first hierarchical serial interconnect network between the endpoints, including the I/O circuitry and the flash storage devices; and
   wherein the first reconfigurable circuitry is configured to capture data during a transfer of data between the first I/O circuitry and the array of flash storage devices and to save the captured data in the first cache storage.

2. The system of claim 1,
   wherein the transfer of data includes a read data transfer; and
   wherein the first reconfigurable circuitry is configured to determine whether data requested during the read data transfer is saved in the first cache storage.

3. The system of claim 1,
   wherein the transfer of data includes a write data transfer; and
   wherein the first reconfigurable circuitry is configured to save data written during the write data transfer to the first cache storage.

4. The system of claim 1,
   wherein the first reconfigurable circuitry includes a cache tags table that indicates data saved in the first cache storage.

5. The system of claim 1,
wherein the first reconfigurable circuitry includes a cache tags table that indicates data saved in the first cache storage;
wherein the transfer of data includes a read data transfer; and
wherein the first reconfigurable circuitry is configured to access the cache tags table to determine whether data requested during the read data transfer is saved in the first cache storage by checking the first cache storage.

6. The system of claim 1,
wherein the first reconfigurable circuitry includes a cache tags table that indicates data saved in the first cache storage;
wherein the transfer of data includes a write data transfer; and
wherein the first reconfigurable circuitry is configured to save data written during the write data transfer to the first cache storage and to indicate the saved data in the cache tags table.

7. The system of claim 1,
wherein the first reconfigurable circuitry includes a cache tags table that indicates data saved in the first cache storage;
wherein the transfer of data includes a write data transfer;
wherein the first reconfigurable circuitry is configured to save data written during the write data transfer to the first cache storage and to indicate the saved data in the cache tags table;
wherein the transfer of data includes a read data transfer; and
wherein the first reconfigurable circuitry is configured to access the cache tags table to determine whether data requested during the read data transfer is saved in the first cache storage by checking the first cache storage.

8. The system of claim 1,
wherein the first server is configured enumerate the endpoints connected to the first hierarchical serial interconnect network, including the first I/O circuitry and the flash storage devices.

9. The system of claim 1,
wherein the first server is configured to enumerate the endpoints connected to the first hierarchical serial interconnect network for use in memory mapped input output during transfer of data over the first hierarchical serial interconnect network, between the enumerated endpoints, including the first I/O circuitry, the first reconfigurable circuitry and the flash storage devices.

10. The system of claim 1 further including:
second I/O circuitry;
a second server configured to provide a root complex;
first reconfigurable circuitry;
an array of flash storage devices;
second cache storage; and
a second hierarchical serial interconnect network that includes the root complex, the second reconfigurable circuitry, a switch circuitry, and a plurality of serial data communication paths;
wherein the second hierarchical serial interconnect network includes a network interface tier that includes third switch circuitry and a serial communication path that interconnects the third switch circuitry and the second I/O circuitry, which is coupled as an endpoint to the network;
wherein the second hierarchical serial interconnect network includes a storage tier that includes fourth switch circuitry and a serial communication path that interconnects the fourth switch circuitry and a flash storage device of the array of the flash storage devices, which is coupled as an endpoint to the network;
wherein the second hierarchical serial interconnect network includes a serial communication path that interconnects the third switch circuitry and the second server;
wherein the second hierarchical serial interconnect network includes a serial communication path that interconnects the second reconfigurable circuitry and the third switch circuitry; and
wherein the second hierarchical serial interconnect network includes a serial communication path that interconnects the second reconfigurable circuitry and the fourth switch circuitry;
wherein the second reconfigurable circuitry is coupled to transfer data between the second cache storage and the third switch circuitry and between the second cache storage and the fourth switch circuitry;
wherein the second server is configured to designate a second interconnect address space for use during transfer of data over the second hierarchical serial interconnect network between the endpoints, including the I/O circuitry and the flash storage devices; and
wherein the second reconfigurable circuitry is configured to capture data during a transfer of data between the second I/O circuitry and the array of flash storage devices and to save the captured data in the second cache storage.

* * * * *

UNITED STATES PATENT AND TRADEMARK OFFICE
CERTIFICATE OF CORRECTION

PATENT NO. : 9,870,154 B2
APPLICATION NO. : 15/000949
DATED : January 16, 2018
INVENTOR(S) : Mehrotra et al.

Page 1 of 1

It is certified that error appears in the above-identified patent and that said Letters Patent is hereby corrected as shown below:

On the Title Page

In Column 2, item [56], under "Other Publications", Line 1, delete "Notice of Allowance" and insert --Non Final Office Action-- therefor On page 2, in Column 1, item [56], under "U.S. Patent Documents", Line 38, delete "2010/0248107 A1" and insert --2010/0241807 A1-- therefor On page 2, in Column 2, item [56], under "Other Publications", Line 37, delete "Simplied" and insert --Simplified-- therefor On page 3, in Column 1, item [56], under "Other Publications", Line 7, delete "Non-transpatent" and insert --Non-transparent-- therefor Signed and Sealed this
Fourth Day of June, 2019

Andrei Iancu
*Director of the United States Patent and Trademark Office*